United States Patent [19]
Wallace

[11] 3,900,183
[45] Aug. 19, 1975

[54] DIE ATTACHMENT FOR FORMING SPLIT TYPE FASTENERS ON MOLDED PARTS

[76] Inventor: Maynard Wallace, 38172 Seaway Dr., Mt. Clemens, Mich. 48073

[22] Filed: Mar. 5, 1974

[21] Appl. No.: 448,190

[52] U.S. Cl. .................. 249/68; 425/468; 425/444
[51] Int. Cl.² ...................... B29C 7/00; B29C 1/06
[58] Field of Search ............ 249/66, 67, 68, 83, 98; 425/468, 444, 290; 30/277, 367, 164.6

[56] References Cited
UNITED STATES PATENTS
1,424,221   8/1922   Trumpeter .......................... 30/164

Primary Examiner—Francis S. Husar
Assistant Examiner—Robert J. Charvat
Attorney, Agent, or Firm—Harness, Dickey & Pierce

[57] ABSTRACT

A die attachment comprising a four-part assembly, namely, a sleeve mountable in the die, a forming wedge carried by the sleeve, a cap holding the forming wedge, and an ejector pin. When assembled to the die, a cavity is formed which will produce a split type snap fastener integral with the molded part.

7 Claims, 4 Drawing Figures

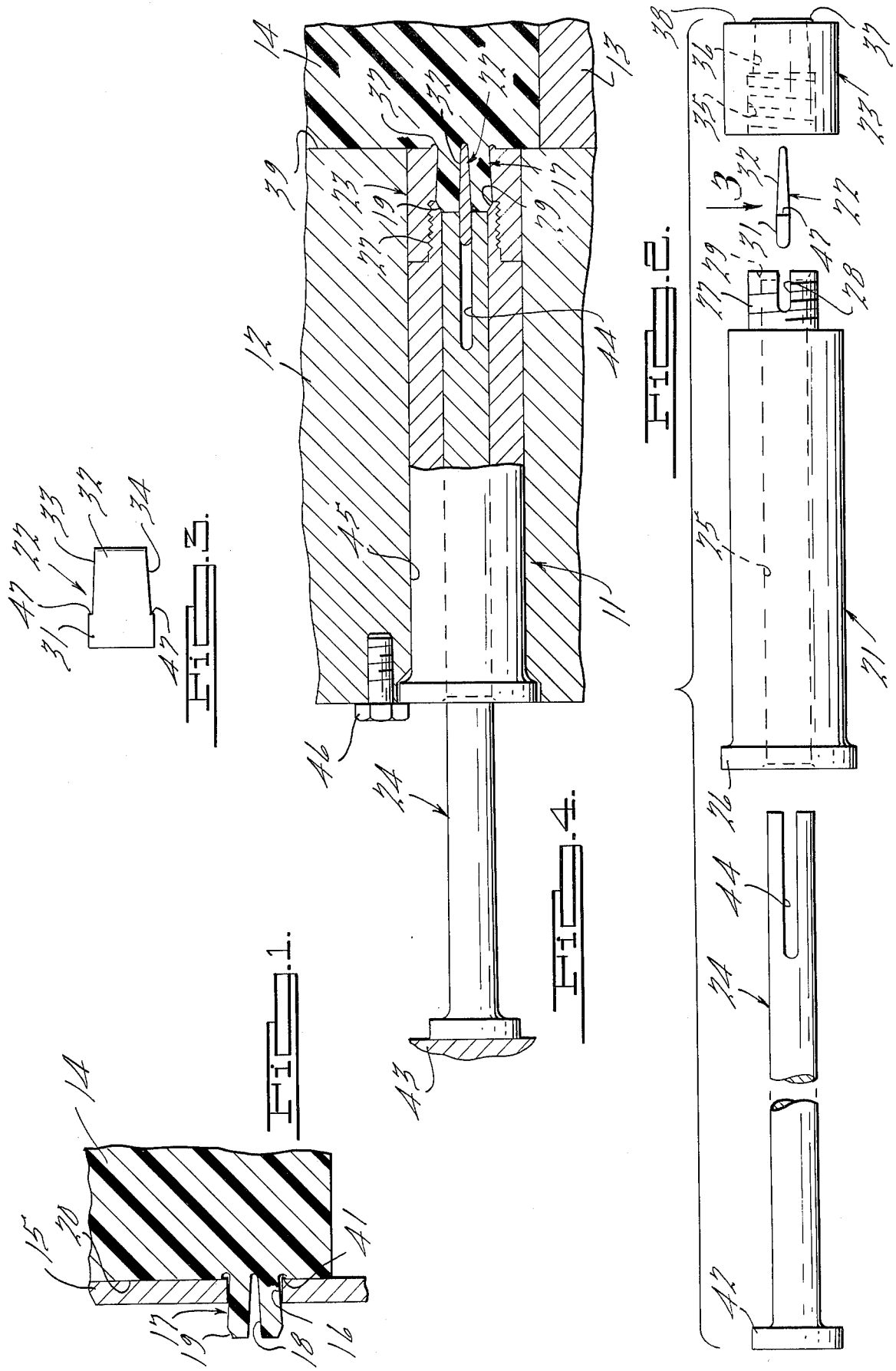

DIE ATTACHMENT FOR FORMING SPLIT TYPE FASTENERS ON MOLDED PARTS

BACKGROUND OF THE INVENTION

The invention relates to dies for forming parts such as automobile lamp lenses, toys, and other items which are to be fastened to bases. Conventionally, such molded parts are attached to the bases by gluing or screwing. If the latter, the molded part is formed with an apertured boss for receiving the screw.

BRIEF SUMMARY OF THE INVENTION

It is an object of the present invention to provide a die attachment which will enable a split type snap fastener to be molded integrally with the part whereby the part may be attached to the base by snapping the fastener into an aperture, thus eliminating the need for gluing or screwing.

It is a further object to provide a die attachment of this type in which the amount of taper on the snap fastener can be altered in a simple and inexpensive manner.

BRIEF DESCRIPTION OF THE DRAWING

FIG. 1 is a fragmentary cross sectional view showing a typical part carrying a split type snap fastener which the invention is adapted to manufacture.

FIG. 2 is an exploded view in elevation of the parts of the invention.

FIG. 3 is a top plan view of the forming wedge taken in the direction of arrow 3 of FIG. 2, and FIG. 4 is a partially sectioned view showing the invention assembled in a die.

DESCRIPTION OF THE PREFERRED EMBODIMENT

The invention is generally indicated at 11 in FIG. 1 and is intended to be used in conjunction with a die partially shown at 12 and 13. The part is partially indicated at 14, and is intended to be mounted on a base 15 (FIG. 1) after manufacture. The mounting means is to comprise an aperture 16 in base 15 and a split type snap fastener generally indicated at 17 integrally formed on and projecting from part 14. A number of fasteners 17 will normally be provided around the edges of part 14 depending upon its shape. Fastener 17 is of a slightly flared circular shape, having a diametral slot 18 and a chamfer 19 for insertion in aperture 16. Preferably, the depth of slot 18 will bring it slightly beyond surface 20 of the part. While being inserted, fastener 17 will slightly collapse, and then will spring out beyond aperture 16 to hold the part in place.

Attachment 11 comprises four parts, a sleeve generally indicated at 21, a forming wedge generally indicated at 22, a cap generally indicated at 23, and an ejector pin generally indicated at 24. Sleeve 21 is of cylindrical shape having a central bore 25, a flange 26 at its outer end, and a threaded portion 27 at its inner end, portion ⊥ ˋhᴄ.ng of smaller diameter than the main portion of the ₒ.eeve. A diametral slot 28 extends partially into portion 27, and the end of bore 25 within portion 27 has a flare 29.

Forming wedge 22 is best seen in FIGS. 2 and 3. It is of generally flat shape, with a mounting portion 31 receivable by slot 28 and a slot forming portion 32. The width of portion 31 is the same as the diameter of sleeve portion 27. Portion 32 is slightly wedge-shaped as seen from the side (FIG. 2) and its two side edges 33 and 34 are slightly tapered toward each other (FIG. 3). This taper is complementary to the desired flare of fastener 17 when in its unstressed condition. The length of portion 32 is such that it will produce a slot 18 of the desired depth.

Cap 23 is of cylindrical shape, having an internally threaded bore portion 35 for mounting on sleeve portion 27, and a slightly tapered bore portion 36 for forming the exterior of fastener 17. The taper of bore portion 36 corresponds to that of edges 33 and 34 of forming wedge 22, and portion 32 of the forming wedge will fit into this bore portion when the parts are assembled. Cap 23 also has an annular rib 37 formed on its surface 38, which surface will be flush with surface 39 of die portion 12 when the parts are in operational position. Rib 37 is for the purpose of forming a slight recess 41 at the base of fastener 17, where it joins surface 20 of part 14 to facilitate use of the fastener.

Ejector pin 24 is of cylindrical shape, being substantially longer than sleeve 21. A head 42 is formed at the outer end of ejector pin 24, so that an operating member shown partially at 43 may move the ejector pin. A slot 44 is formed at the inner end of the ejector pin, this slot having a width such to that of forming wedge 22 will be accommodated. Ejector pin 24 is slidable within bore 25 between an outer position shown in FIG. 4 and an inner position ejecting the part.

Die attachment 11 is assembled as shown in FIG. 4, being mounted in a cylindrical bore 45 in die portion 12 and held in position by means such as a screw 46 engaging flange 26. Forming wedge 22 will be inserted in slot 28 and cap 23 screwed onto sleeve portion 27, holding the forming wedge in place by means of shoulders 47 located between portions 31 and 32. Surface 38 of cap 23 will be flush with surface 39 of die portion 12. When part 14 is molded, material will flow into the cavity formed by cap 23, forming wedge 22, flared portion 29 of sleeve 21, and the end surface of ejector pin 24. The ejector pin will be held in this position by member 43. Thus, the slight flare on fastener 17 will be formed by bore portion 36 of the cap, chamfer 19 by flared bore portion 29, diametral slot 18 by wedge portion 22, and recess 41 by lip 37.

After the part has been molded, ejector pin 24 will force fastener 17 out of cap 23. The two parts of fastener 17 will contract toward each other as they pass through tapered bore portion 36, this movement being permitted by the shape of forming wedge 22.

If it is desired to change the shape of the fastener flare, this may be accomplished by changing cap 23 and forming wedge 22, without the necessity of replacing sleeve 21 or ejector pin 24.

I claim:

1. In combination with die parts defining a die cavity, a die attachment for forming a split type fastener on a molded part, comprising a sleeve having a bore and an inner end facing the die cavity, a forming wedge carried by the inner end of said sleeve, a cap mounted on the inner end of said sleeve and holding said forming wedge in place, said cap having a bore for forming the outer surface of said fastener, said forming wedge extending into said cap bore for forming the slot of said fastener, and an ejector pin slidably mounted in said sleeve and movable between an outer position in which its end coacts with the surfaces of the cap bore, sleeve end and forming wedge to form a cavity for molding the fastener, and an inner position in which it ejects the molded fastener from the bore, the ejector pin having a slot for accommodating said forming wedge.

2. The combination according to claim 1, the inner end of said sleeve bore having a flared portion for forming a chamfer on said fastener.

3. The combination according to claim 1, said cap bore being slightly tapered so as to form a corresponding slight flare on said fastener.

4. The combination according to claim 3, said forming wedge being tapered whereby ejection of said fastener from said sleeve bore will be permitted.

5. The combination according to claim 1, said cap having an annular lip surrounding said bore, whereby a recess will be formed at the base of said fastener.

6. The combination according to claim 1, the inner end of said sleeve having an externally threaded portion, and an internally threaded portion on said cap mountable on said sleeve.

7. An attachment for a die used to form a part having an integral split type fastener, comprising a bored sleeve of cylindrical shape with an inner portion of narrower diameter, the end of the sleeve bore within said inner portion being flared to form a chamfer on said fastener, a diametral slot in the inner end of said sleeve, a forming wedge having a mounting portion in said slot with a width equal to the diameter of said inner sleeve portion and a narrower wedge-shaped forming portion with shoulders between said portions, a cap engaging said shoulders to hold the forming wedge in place, said cap having a first bore portion secured on said inner sleeve portion and a forming bore portion of smaller diameter than said first bore portion, the forming portion of said wedge being disposed within said forming bore portion of the cap, the sides of said forming portion of the wedge engaging said forming bore portion of the cap with both having a slight taper, an annular lip on said cap surrounding said forming bore portion for creating a recess around the base of said fastener, and an ejector pin slidably mounted in said sleeve bore and movable between an outer position in which its end forms the end of the fastener cavity and an inner position ejecting the fastener, said ejector pin having a slot for accommodating said forming wedge.

* * * * *